2,892,737

REFINING HYDROLYZATES OF STARCH BY ION EXCHANGE

Robert G. Rohwer and John E. Cadotte, Clinton, Iowa, assignors, by mesne assignments, to Standard Brands Incorporated, New York, N.Y., a corporation of Delaware No Drawing. Application July 26, 1955
Serial No. 524,597

8 Claims. (Cl. 127—40)

This invention relates to an improved system for refining the acid hydrolyzates of starch, and more particularly to the use of ion exchange resins for refining dextrose liquor for crystallization.

Dextrose is manufactured by hydrolyzing starch with acid and then recovering the dextrose by crystallization. In order to obtain a high grade of "cast dextrose" or dextrose hydrate it is necessary to refine the hydrolysis liquors before the crystallization process. Also the yield of dextrose hydrate can be improved if the liquors are refined.

The conventional refining method used for dextrose liquors has not varied greatly during the years. The usual systems have essentially consisted of clarifying the starch hydrolyzate by neutralization, skimming and filtration, and then treatment with various decolorizing carbons and, on occasion, de-ashing procedures. The carbons employed in refining have been bonechar, granular carbon produced from coal, and vegetable carbons.

Hardness ions such as calcium, magnesium, and heavy metal ions are undesirable in the crystallizer liquors. For example, during the slow crystallization process they form slightly soluble salts of some organic acids, one of which is known to be oxalic acid. Much of this insoluble material is retained in the dextrose cake when the massecuite is centrifuged. When the dextrose thus produced is redissolved in water the insoluble salts which are very small in particle size remain suspended to give the solution a hazy appearance. These small particles of insoluble salts may also serve as foci for spontaneous crystallization producing false grain. These are highly undesirable effects.

Bonechar, as used in refining, tends to throw calcium ions into the crystallizer liquors. A granular carbon produced from coal and other materials has in some instances been substituted for bonechar. Such materials sometimes have the disadvantage of iron leakage into the liquor. Also, further refining to absorb these detrimental ions is desirable. Also, neither bonechar nor the granular carbon from coal accomplishes all the decolorization which is desired and it is necessary in the conventional refining systems to obtain a small degree of further decolorization by using vegetable carbons.

While the vegetable carbons are quite efficient in removing color, they are not effective ash absorbers. What ion removal is accomplished is probably by physical absorption rather than chemical reaction. Vegetable carbons also have the disadvantage of being comparatively expensive.

Various attempts have been made to employ ion exchange resins alone to demineralize liquors and to accomplish decolorization. These attempts have proved to be unsatisfactory, as evidenced by the fact that it was found necessary to retain the vegetable carbons in the system in order to meet the required purity of liquor before crystallization. Furthermore, the conventional demineralization employing a cation resin regenerated with acid and an anion resin regenerated with caustic is expensive and therefore not well suited for commercial operations.

It is, therefore, an object of this invention to improve the system for refining the acid hydrolyzate of starches.

It is a further object of the invention to employ a method for chemically removing undesirable ions from the acid hydrolyzate of starch.

It is another object of the invention to provide a system for refining which is inexpensive and efficient in commercial operation.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, this invention relates to the process for refining a clarified acid hydrolyzate of starch by passing the same through a bed containing a strong base anion exchange resin on the chloride cycle.

More particularly, this invention includes the step of removing the anions above chloride, and preferably also the cations above sodium in the lyotropic series.

The process of the invention may be employed generally with any clarified acid hydrolyzate of starch having a dextrose equivalent within the range from about 75 to 95, but is particularly applicable to the refining of dextrose liquor for crystallization. In the conventional process for the manufacture of corn sugars, the dextrose liquor, after it has been neutralized and clarified, is about 10° Bé. to 12° Bé. and is evaporated to a solution of about 28° Bé. containing 55% to 60% by weight solids. It is contemplated to employ the refining step of the invention to dextrose liquors of from about 10° Bé. to 30° Bé., although it is conveniently conducted after evaporation with the liquor at about 28° Bé. The concentration, however, is not critical within this range.

The ion exchange step may be performed by a batch or fixed bed method, although the latter is preferred. In the batch method the ion exchange resins are added to the liquor contained in the tank and agitated. The resins and liquor are then separated by filtration. In the fixed bed operations the resin materials are packed in a column through which the liquor is passed. The anion exchange resin is used on the chloride cycle and the cation exchange resin on the sodium cycle.

The anion exchange resin is a strong base resin chloride. These strong base resins are amine compounds of styrene polymers and copolymers. They are usually made, sold, and used in a particle size of from 10 to 50 mesh. Suitable ion exchange resins of the type described are sold by Rohm & Haas under the trade name "Amberlite IRA–400," and by Permutit company under the trade name "Permutit S–1."

The cation exchange resin employed in the process may be defined as a sodium salt of an acid cation exchange resin. Suitable materials are the sulfonic acid compounds of high molecular weight resins such as styrene polymers and copolymers and phenolformaldehyde resins. A satisfactory particle size is from 10 to 50 mesh. Suitable compouns of this type are sold by Rohm & Haas under the trade name "Amberlite IR–120," and by Permutit as "Permutit Q."

It is preferred to use a mixed bed containing both the cation and anion resins. The proportions of anion to cation resins in the mixed bed may be as much as 5:1 or as little as 1:3. It has been found in treating clarified dextrose liquors that in a ratio of 1:1 the break-through of both the anion and cation resins occurs at about the same time, so this ratio provides some advantages.

Ordinarily, the temperatures at which the liquors pass through the ion exchange bed are within the range from about 140° F. to 170° F. The rate of flow may be as slow as practical although it is usually 0.3 gallon per minute for one cubic foot of resin. The upper limit is about two gallons per minute for each cubic foot of resin.

In the conventional mixed-bed-ion-exchange unit, the resin is regenerated after exhaustion by first separating the cation from the anion resins. This has been done in the past by hydraulic classification and following the regeneration the resins are again mixed, such as by introducing compressed air at the bottom of the units. It is one of the advantages of the present process that the resins can be regenerated while the resins remain in heterogeneous admixture and without separation. In regenerating the mixed bed of anion and cation resins, all that is needed is to pass a strong aqueous solution chloride therethrough.

The following examples are given for purposes of specific illustrations of the invention. In these examples, all colors were determined at full concentration of the liquor used, without dilution. In the first three examples, the colors are in Lovibond values, caramel series No. 52 measured in a five inch cell.

Example 1

A factory produced clarified acid hydrolyzate of corn starch having a D.E. of 90–92 and at 27.0° Bé. concentration was passed through a 2 cm. (I.D.) glass column containing 200 cc. of 20–50 mesh strong base anion exchange resin ("Permutit S–1") in the chloride form. The influent liquor had a color of 24. It was put through the column at 25° C. at a flow rate of 8.3 ml. per minute. The color of the effluent rose from 8 for the first liter to 11 for the 12th liter. There was no change in the iron, calcium or magnesium content of the liquor. The color was removed from the resin by passing one liter of 10% sodium chloride through the column at a flow rate of 9 ml. per minute followed by washing the column with water to a faint chloride test.

Example 2

A factory produced clarified acid hydrolyzate of corn starch having a D.E. of between 90 and 92, at a concentration of 26.2° Bé. and at a temperature of 25° C. was used for this example. The liquor contained 77.9 p.p.m. iron and 990 p.p.m. calcium and magnesium (calculated as $CaCO_3$), both dry basis, and had a color value of 62. The material was divided into two fractions and one portion of it was treated with activated carbon while the other was resin-treated.

A. Treatment of one portion of this liquor with 0.6% Nuchar CEE did not change the calcium or magnesium content, but it reduced the iron content to 15.5 p.p.m. and the color to 27.

B. The other portion of the liquor was but through a 2 cm. (I.D.) glass column containing 200 cc. of 20–50 mesh "Permutit Q" cation exchange resin in the sodium form (flow rate 16 cc. per minute). The effluent from this column was put through a similar column containing 200 cc. of "Permutit S–1" anion exchange resin in the chloride form. Both resins had been previously used and regenerated twice.

The effluent from the two resin columns contained 0.3 p.p.m. iron and only traces of calcium and magnesium for the first 12.5 liters. From this point these ions increased rapidly. The color of the effluent started from 7 for the first liter and rose only to 14 for the 12th liter.

After washing the sugars from the columns one liter of 10% sodium chloride was put through the cation and anion exchange columns at a flow rate of 10 ml. per minute. Three liters of water were then used to wash the columns nearly free of chloride ions.

Example 3

When the same liquor was first put through the anion exchange bed followed by the cation exchange bed, and otherwise according to the procedure in Example 2 the product obtained was identical to that described in Example 2.

Example 4

A factory produced clarified acid hydrolyzate of corn starch having a D.E. of between 90 and 92, at a concentration of 25.7° Bé., and a temperature of 125° F. was used for this example. The liquor contained 1140 p.p.m. calcium and magnesium (as calcium carbonate) and 59 p.p.m. iron on a dry basis. Its color as measured by the percent transmission at 450 mu in a Coleman spectrophotometer was 11.1% T. The liquor was divided into two fractions and one portion of it was treated with vegetable carbons while the other was resin treated.

A. Treatment of one portion of this liquor with 0.6% vegetable carbon did not change the calcium or magnesium content, but it reduced the iron to 31.2 p.p.m. and increased the percent transmission at 450 mu to only 21.1.

B. The other portion of the liquor was put through a two inch (I.D.) glass column at a flow rate of 36 ml. per minute. The glass column contained a cation exchange resin (750 cc. of "Amberlite IR–120" on the sodium cycle) and an anion exchange resin (750 cc. of "Amberlite IRA–400" on the chloride cycle) which had been regenerated from a previous run by passing three liters of 10% sodium chloride through the column followed by a water wash of six liters (flow rate 36 ml. per minute). Throughout the first 33.8 liters of effluent the calcium and magnesium content of the effluent ranged between 76 and 83 p.p.m. and the iron content between 1.7 and 5.7 p.p.m. The percent transmission at 450 mu of this effluent decreased from 34.2% at the start to 22.0 at the end of the run.

After the refining steps and ion exchange according to the foregoing procedure, the dextrose liquors are evaporated to about 80–88% dry substance and may be merely cast into molds and allowed to solidify. Where refined sugars are desired the liquor is evaporated only to about 75% by weight on a dry solids basis and crystallized in motion. The crystals are usually separated from the mother liquor by centrifugation and thereafter usually washed and dried.

Other modes of applying the principle of the invention may be employed, change being made as regards the details described, provided the features stated in any of the following claims or the equivalent of such be employed.

We, therefore, particularly point out and distinctly claim as our invention:

1. The process of refining which includes the step of passing a clarified acid hydrolyzate of starch having a dextrose equivalent in the range from about 75 to 95 through a bed containing a strong base anion exchange resin on the chloride cycle.

2. The process of claim 1 wherein said clarified acid hydrolyzate is at a temperature in the range from about 140° F. to 170° F.

3. The process of refining which includes the step of passing a clarified acid hydrolyzate of starch having a dextrose equivalent in the range of from about 75 to 95 through a series of beds at least one of which is a strong base anion exchange resin on the chloride cycle and at least one of which is the sodium salt of an acid cation exchange resin.

4. The process of claim 3 wherein said clarified acid hydrolyzate is at a temperature in the range from about 140° F. to 170° F.

5. The process of refining which includes the step of passing a clarified acid hydrolyzate of starch having a dextrose equivalent in the range from about 75 to 95 through a mixed bed containing a mixture of a strong base anion exchange resin on the chloride cycle and the sodium salt of an acid cation exchange resin in which the proportions of said anion to cation exchange resins is in the range from 5:1 to 1:3.

6. The process of claim 5 wherein said clarified acid hydrolyzate is at a temperature in the range from about 125° F. to 170° F.

7. The process which includes the steps of passing a clarified acid hydrolyzate of starch having a dextrose equivalent in the range from about 75 to 95 through a mixed bed containing a mixture of a strong base anion exchange resin on the chloride cycle and the sodium salt of an acid cation exchange resin in which the proportions of said anion to cation exchange resins is in the range from 5:1 to 1:3 and subsequently regenerating said mixed bed of exchange resin by passing a solution of sodium chloride therethrough.

8. The process of removing anions above chloride in the lyotropic series from the hydrolyzate of starch which comprises passing a clarified acid hydrolyzate of starch having a dextrose equivalent in the range from about 75 to 95 through a bed containing a strong base anion exchange resin on the chloride cycle.

References Cited in the file of this patent

UNITED STATES PATENTS

| | | |
|---|---|---|
| 2,490,716 | Smith | Dec. 6, 1949 |
| 2,551,519 | Winters | May 1, 1951 |
| 2,578,937 | Kunin | Dec. 18, 1951 |
| 2,578,938 | Kunin | Dec. 18, 1951 |
| 2,606,847 | Newkirk | Aug. 12, 1952 |
| 2,635,061 | McBurney | Apr. 14, 1953 |
| 2,649,390 | Winters | Aug. 18, 1953 |
| 2,650,177 | Meyer | Aug. 25, 1953 |
| 2,785,998 | Harding | Mar. 19, 1957 |

OTHER REFERENCES

"Ion Exchange Technology," by Nachod, Schumbert, Academic Press Inc., 1956, p. 248.

UNITED STATES PATENT OFFICE
CERTIFICATE OF CORRECTION

Patent No. 2,892,737　　　　　　　　　　　　　　　　　　　　June 30, 1959

Robert G. Rohwer et al.

It is hereby certified that error appears in the printed specification of the above numbered patent requiring correction and that the said Letters Patent should read as corrected below.

Column 3, line 20, before "chloride" insert -- of sodium --.

Signed and sealed this 24th day of May 1960.

(SEAL)
Attest:

KARL H. AXLINE
Attesting Officer

ROBERT C. WATSON
Commissioner of Patents